United States Patent Office 3,019,389
Patented Jan. 30, 1962

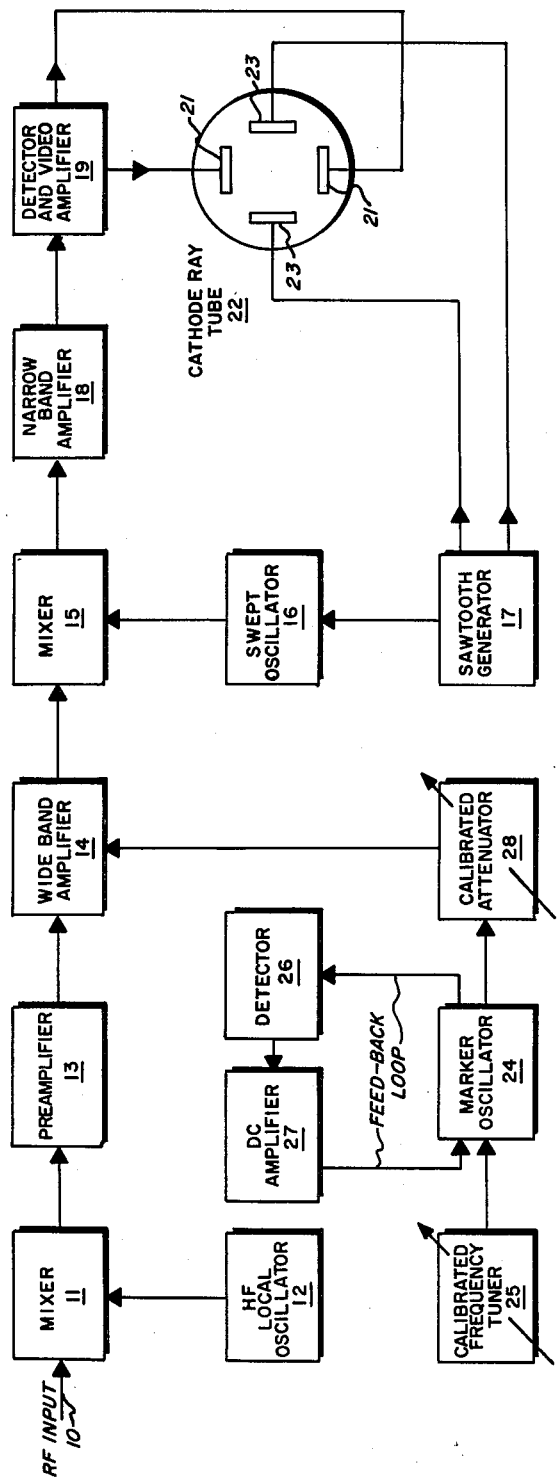

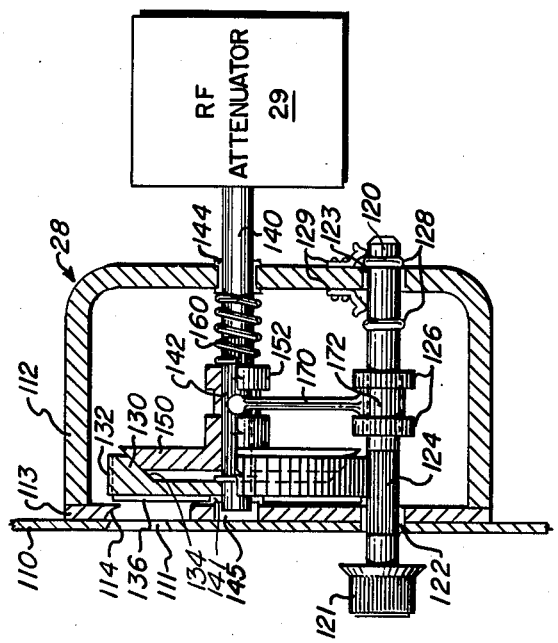
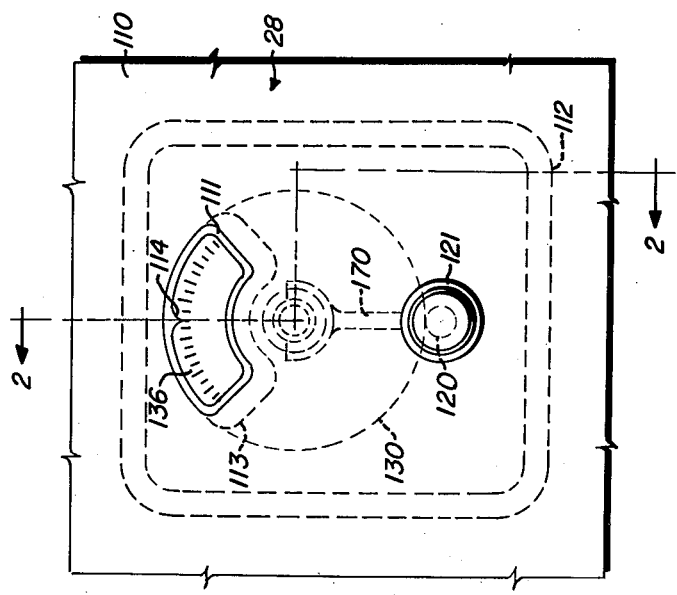

3,019,389
SPECTRUM ANALYZER WITH RELATIVE
AMPLITUDE MARKER
Alan Ross, Bayside, and Joseph S. Eisenmeyer and Isadore Rakofsky, Brooklyn, N.Y., assignors to Polarad Electronics Corporation, Long Island City, N.Y., a corporation of New York
Filed Dec. 1, 1959, Ser. No. 856,410
5 Claims. (Cl. 324—77)

The present invention relates to spectrum analyzers for analyzing electromagnetic signals and more particularly to such spectrum analyzers wherein means is provided for producing a marker on the spectrum display which may be correlated in amplitude with the signal being displayed.

Such spectrum analyzers are utilized for the study of electromagnetic signals and particularly for radio frequency signals in the microwave frequency range; by means of such a spectrum analyzer a complete and reasonably accurate representation of all various frequency components of a complex radio frequency signal may be obtained. A typical example of a complex radio frequency signal which might be analyzed is a rectangularly pulse modulated radio frequency signal. As may be shown by a Fourier analysis of such a wave form, it may be broken down into a number of components of different frequencies, each frequency having a particular associated amplitude. In the usual form of radio frequency spectrum analyzer a display is produced wherein the component parts of the signal to be analyzed are represented with the frequency of the component represented on the horizontal axis of an oscilloscope and the amplitude associated with each frequency on the vertical axis of the oscilloscope.

Although the display provided gives a good qualitative presentation of the frequency components of the signal it is frequently desirable to obtain a more accurate quantitative measurement; for example it may be desired to measure the relative amplitude of various lobes of the frequency distribution. Heretofore, it was necessary to rely upon graduations on the face of the display tube or to otherwise directly measure the relative height of the lobes on the display in order to obtain such data. Such a method is obviously subject to disadvantages in that errors may occur in the measurement or in calculations required in converting physical measurements to terms of relative amplitude; furthermore, there may be some non-linearity of the display with respect to amplitude and some error is likely to be introduced for this reason. The present invention provides an electronic marker arrangement which makes it possible to produce a pip or marker on the face of the oscilloscope by the introduction of a locally generated signal of known and controllable amplitude. The locally generated signal may be adjusted in amplitude so that its height corresponds to the height of a particular portion of the spectrum to be measured. The marker may also be utilized to compare directly one portion of the spectrum with another portion to determine their relative amplitudes.

Although the present discussion refers throughout to "amplitude" of the signal, it will be understood that often the power or average power will be the parameter of interest; the power is, however, readily determinable from the amplitude (being proportional to the square thereof), and these parameters may be considered interchangeable for purposes of simplification in some cases.

The amplitude marker generated in accordance with the invention will normally be variable in frequency to allow it to be traversed horizontally back and forth across the display. Thus it will also serve the purpose of a frequency marker, which type of marker has previously been separately provided for use in more accurately comparing frequencies of various portions of the spectrum being analyzed.

In addition to the features and advantages set forth above, it is an object of the present invention to provide apparatus for causing a marker to appear on a spectrum analyzer display in such a manner that the height of the marker on the display is correlated to a particular signal amplitude. It is another object of the present invention to provide such a marker which is generated by means of a locally generated signal and wherein the generator of said signal is calibrated to provide different signal amplitudes of known relative magnitude.

It is a further object of the present invention to provide a marker for a spectrum analyzer display which is electronically generated and which is accurately controllable and calibrated in amplitude as well as in frequency.

Further objects and advantages will be apparent from a consideration of the following description in conjunction with the appended drawings in which:

FIGURE 1 is a block diagram showing schematically a spectrum analyzer incorporating the present invention.

FIGURE 2 is a front elevational view of the attenuator assembly of the marker signal generator forming a part of the present invention.

FIGURE 3 is a sectional view taken along the lines 2—2 in FIGURE 3 showing the construction of the attenuator assembly.

Figure 4:
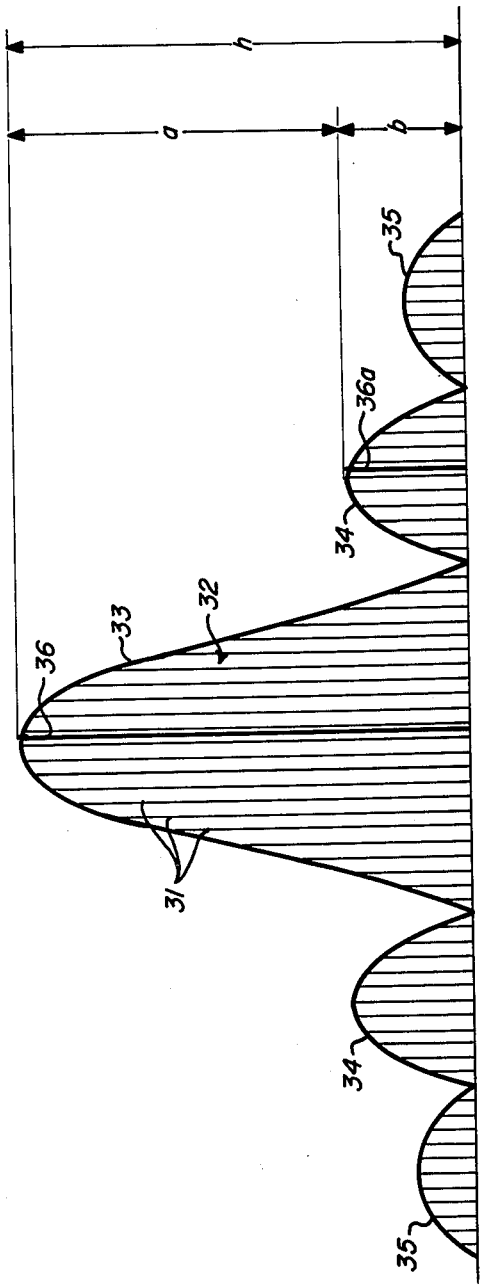
FIGURE 4 is a diagrammatic representation of a typical spectrum analyzer display of the spectrum of a pulse modulated radio frequency wave showing also the appearance of the amplitude marker produced in accordance with the present invention.

Referring now to FIGURE 1, a block diagram is shown which illustrates schematically a microwave radio frequency spectrum analyzer incorporating an amplitude measuring marker circuit according to the present invention. A microwave frequency spectrum analyzer is shown by way of example but the invention is not limited to such frequencies. An RF signal is fed to the input 10 of the spectrum analyzer and is heterodyned by a mixer 11 to convert it to a lower frequency for the facilitation of amplification and other operations to be performed by the remainder of the circuit. The mixer 11 is supplied with a local oscillator signal from the high frequency local oscillator 12. If desired, the high frequency local oscillator 12 may be tuneable in frequency so that the spectrum analyzer may be tuned to a desired frequency range.

A preamplifier 13 amplifies the converted signal from the mixer 11 and supplies it to a wide-band amplifier 14. The wide-band amplifier 14 also receives a marker signal as will be explained hereinafter. The signal from the wide-band amplifier 14 is supplied to a second mixer 15. The mixer 15 is supplied also with a frequency swept local oscillator signal from the swept oscillator 16.

The manner in which the signal from the swept oscillator 16 is varied in frequency is controlled by a saw-tooth wave generator 17 which supplies a saw-tooth voltage to control the frequency output of the voltage controllable swept oscillator 16.

Assuming that the output of the mixer 15 is of a frequency equal to the difference between the swept oscillator frequency and the frequency of the output from the wide-band amplifier, it will be observed that a signal having a particular frequency supplied to the mixer 15 from the wide-band amplifier 14 will appear in the output from the mixer 15 as a signal varying in frequency with time in cyclic fashion at a rate determined by the saw-tooth wave generator 17.

The output from the mixer 15 is supplied to a narrow band amplifier 18 which passes only a limited range of frequencies which may in a typical case be on the order of tens of kilocycles. Thus at any instant of time only those signals will be accepted which arrive at the mixer 15 within a predetermined range of frequencies on the order of tens of kilocycles such that when heterodyned with the instantaneous frequency of the swept oscillator 16 they will be accepted by the narrow-band amplifier 18; all other signals will be rejected.

Furthermore, since the frequency of signals appearing at mixer 15 bears a predetermined relationship to the RF input frequencies at the RF input 10, at any given instant of time only RF input signals within a narrow predetermined range of frequencies will be passed through the circuit and through the narrow-band amplifier 18. Furthermore, the center frequency of this range of accepted frequencies will be continuously swept in time at a rate and in a fashion determined by the saw-tooth generator 17 and the swept local oscillator 16.

The output from the narrow-band amplifier 18 is supplied to a detector and video-amplifier circuit 19, which produces a detected signal having an amplitude corresponding to the envelope of the alternating signal output from the narrow-band amplifier. Thus the output from the detector and video-amplifier 19 has at each instant of time an amplitude corresponding to the amplitude (if any) of received radio frequency signals within a narrow range of frequencies, and in the course of time this narrow range of sampled frequencies is swept through a larger range of frequencies in saw-tooth fashion. The output from the detector and video amplifier circuit 19 is supplied to the vertical deflection plates 21 of a cathode ray tube 22.

The horizontal deflection plates 23 of the cathode ray tube 22 are supplied with a deflection signal from the saw-tooth generator 17 which corresponds with the cyclic variation of the acceptance frequency of the spectrum analyzer circuit. In other words, for any position along the horizontal axis (abscissa) of the electron beam of the cathode ray tube 22 there is a corresponding narrow frequency range which will be accepted by the spectrum analyzer to produce a vertical deflection of the electron beam corresponding to the amplitude of a radio frequency signal within that narrow range.

Thus it will be observed that the typical spectrum analyzer circuit illustrated in FIGURE 1 causes a display to be produced upon the cathode ray tube 22 representative of the frequency distribution of the various frequency components supplied to the input of spectrum analyzer.

It will be understood that the previous explanation of the operation of the spectrum analyzer is greatly simplified and is presented in order that the operation of a marker generator constructed according to the present invention can be understood. Many variations in the construction of spectrum analyzers or, as they are sometimes called, panoramic receivers, are known in the art and it will be understood that marker generators according to the present invention can be incorporated into many different kinds of spectrum analyzers in addition to the specific type indicated schematically by way of example. Any modifications required to adapt the marker generator to various types of spectrum analyzers will be obvious to those skilled in the art.

In order to provide a relative amplitude measuring marker, a marker oscillator 24 is provided which may be made tuneable in frequency by means of a frequency tuner 25.

The marker oscillator 24 is preferably stabilized in amplitude such as by the use of a detector 26 connected to receive an output from the oscillator and a D.C. amplifier 27 coupled to receive the output from the detector and to feed back a signal to control the amplitude of output from the marker oscillator in a fashion well known in the art.

A calibrated attenuator 28 is provided to supply a signal of accurately controllable amplitude from the marker oscillator 24. The output from the calibrated attenuator 28 is supplied to the wide-band amplifier 14 where it is combined with the signal from the preamplifier 13. The frequency of the marker oscillator is determined so that an output can be provided to correspond to any point in the frequency range of signals which may be produced by the preamplifier 13.

From the foregoing explanation it will be seen that the marker signal is processed by circuit elements 14, 15, 18 and 19 in the same fashion as signals received from the RF input 10 so that an indication in the nature of a vertical line will appear on the face of cathode ray tube 22 at a frequency (abscissa), dependent upon the marker oscillator frequency and having a height (ordinate) depending upon the amplitude of the marker oscillator signal supplied from the calibrated attenuator 28 to the wide-band amplifier 14.

A particular form of calibrated attenuator is shown in FIGURES 2 and 3. An RF attenuator 29 is provided for attenuating the output from the marker oscillator 24. The RF attenuator 29 may be of any suitable form and may consist, for example, of a coupling loop located in a wave guide below cutoff extending into the marker oscillator radio frequency cavity. In such an attenuator, the attenuation of the output signal bears a logarithmic relation to the physical displacement of the coupling loop so that the attenuation in decibels may be directly related to the movement of the coupling loop.

The RF attenuator 29 is provided with a shaft 140 for controlling the attenuation provided by the RF attenuator. The shaft 140 extends through a bearing 144 into an attenuator dial mechanism housing 112. The housing 112 may be mounted to a portion of the front panel 110 of the spectrum analyzer control panel by means of housing cover 113.

The shaft 140 is splined as shown at 142 and is supported at its end by a bearing 145. A disk gear 130 is rotatably mounted on shaft 140 and is axially restrained by collars 141. A drive shaft 120 is provided for rotating the disk gear 130 through the intermeshing engagement of teeth 132 of the disk gear 130 with teeth 124 cut into shaft 120. A knob 121 is provided for rotation of drive shaft 120 and drive shaft 120 is rotatably supported by bearings 122 and 123.

It will be noted that shaft 120 is also axially movable between limits composed by collars 128. Spring members 129 act as detents for restraining drive shaft 120 at one or the other of its limits of movement.

A yoke 170 having a bearing portion 172 is mounted on shaft 120 with rotational freedom of movement therebetween. Yoke 170 is, however, restrained to move longitudinally with the shaft 120 by means of collars 126 secured on shaft 120.

Yoke member 170 engages a groove 152 in the hub of a cone clutch member 150 mounted on RF attenuator shaft 140. The cone clutch member 150 is mounted for limited freedom of longitudinal movement with respect to shaft 140 but is restrained from rotational movement with respect to shaft 140 by means of splines 142 in shaft 140, and is urged to the left in FIGURE 3 by spring 160 where it engages a mating conical cutout section 134 in disk gear 130.

A dial 136 is provided on the face of disk gear 130, which is visible through a window 111, in the panel 110. A stationary cursor 114 may be provided on the window 111 for reading of the dial 136.

The apparatus described may be used to measure the relative amplitude of various frequency components of a radio frequency spectrum as follows.

The necessary adjustments may be made to cause the radio frequency spectrum of the signal to be analyzed to be displayed on the face of cathode ray tube 22. If the marker oscillator 24 is operating it will cause a marker of predetermined height to appear at a portion of the spectrum display corresponding to a particular frequency.

A typical radio frequency spectrum as might be produced by a rectangularly pulse modulated radio frequency signal is shown in FIGURE 4. As will be seen from FIGURE 4, the radio frequency spectrum is represented by a series of lines extending vertically from a base line and of varying heights. In some cases the lines in the display will not be clearly resolved and a more continuous pattern will result. The vertical lines 31 have varying heights such that their envelope 32 forms a symmetrical multilobed pattern having a large central lobe 33 and successively smaller side lobes 34 and 35. In some cases still more side lobes will be discernible.

If it were desired to measure the relative amplitude of central lobe 33 as compared with right side lobe 34, the frequency of the marker oscillator would be adjusted to bring the marker 36 near the center of the central lobe 33. The marker attenuator knob 121 would then be extended to the position shown in FIGURE 3 to cause engagement of cone clutch member 150 with disk gear 130 so that rotation of knob 121 will cause conjoint rotation of disk gear 130 and shaft 140, thereby allowing the attenuation of the marker oscillator signal and hence the height of marker 36 to be adjusted.

The height of marker 36 would then be adjusted as nearly as possible to height $h$ of lobe 33. The marker oscillator frequency control would then be adjusted to move the marker 36 to the position shown at 36a (there would be no immediate change in amplitude of the marker contrary to the situation shown in FIGURE 4). After (or if desired before) moving the marker from position 36 to 36a, knob 121 of the marker oscillator attenuator control will be moved forward to cause disengagement of cone clutch base member 150 with disk gear 130 so that dial 136 may be rotated without movement of the attenuator shaft 140. Dial 136 may then be moved to the zero position by rotation of knob 121.

After zeroing the dial 136, knob 121 may be returned to its extended position and rotated to adjust the attenuation of the marker oscillator signal and hence the height of marker 36 to the height shown at 36a. The height of marker 36 will therefore be changed by an amount $a$ so that the marker is then of height $b$ equal to that of side lobe 34.

The amount of attenuation required to diminish the height of marker 36 to that shown at 36a and hence the relative amplitude of lobes 33 and 34 in decibels may be read directly from dial 136 at the end of this operation. It is assumed that the dial 136 will be calibrated directly in decibels (of relative amplitude), although some other calibration could be provided if desired in a particular case.

Although the operation of the device has been described with reference to a particular type of spectrum, it will be appreciated that a similar technique could be utilized with virtually any form of frequency spectrum. Furthermore, in some cases it may be desired to calibrate the marker oscillator attenuator in terms of a definite power level so that a direct reading of power is provided rather than a reading indicating relative signal amplitudes as in the arrangement previously described.

From the foregoing explanation it will be seen that apparatus is provided according to the present invention which enables one to determine the amplitudes or relative amplitudes of various frequency components of a frequency spectrum with remarkable facility. It may also be noted that if the marker oscillator 24 is accurately controlled in frequency and is provided with a properly calibrated frequency control the marker generated by marker oscillator 24 may be utilized to read directly the frequency of a particular frequency component coinciding in horizontal position with the marker on the cathode ray tube screen. Thus, the amplitude measuring marker according to the present invention may also be arranged to perform the function of frequency markers previously known and used in radio frequency spectrum analyzers.

It should further be noted that the arrangement shown and described has the advantage that any non-linearities which exist in the response of the spectrum analyzer stages subsequent to the injection of the marker oscillator signal operate equally on the marker oscillator signal and the spectrum being analyzed and thus do not prevent accurate determination of relative amplitudes by means of the relative amplitude measuring marker apparatus. This would allow, for example, the use of intentionally unlinear response in the display means or other portion of the circuit without interfering with the operation of the amplitude measuring marker. It will be understood that the particular point in the analyzer circuit at which the marker signal is injected may be varied to meet various requirements and conditions, but that it will normally be injected prior to the swept frequency stage of the analyzer.

Numerous variations and modifications to the invention will be obvious to those of ordinary skill in the art in addition to those shown and suggested herein, and accordingly it is desired that the scope of the invention not be limited to the particular embodiment shown or suggested, but rather that it be limited solely by the appended claims.

What is claimed is:

1. In a radio frequency spectrum analyzer for analyzing a radio frequency signal, said spectrum analyzer having a frequency selective circuit responsive to a relatively small range of frequencies, which relatively small range of frequencies is swept in time over a larger range of frequencies, and a display for indicating the amplitude of component portions of signals supplied to said analyzer in relation to the frequencies of said portions, a relative amplitude-measuring marker circuit comprising a signal generator with substantially stable amplitude output, means for controlling the frequency of said generator, means for controlling the amplitude of the output of said generator, means for supplying the output of said generator to said analyzer to cause an indication to appear on said display correlated to the frequency and amplitude of said generator in like fashion to the correlation of indications of frequency and amplitude of the radio frequency signal being analyzed, said amplitude control means having a control element, the variation of which bears a logarithmic relation to the amplitude of the output of said generator, and an amplitude control means indicator calibrated to read relative amplitudes and selectively connectable to indicate variations in said control element or, alternatively, adjustable to be independently controllable; whereby said control element may be varied to cause said indication produced on said display to correspond in amplitude to a particular portion of the radio frequency signal displayed, said amplitude control means indicator may be independently adjusted to a zero point and said control element may thereafter be varied, with corresponding change of indication of said control means indicator, to produce an indication on said display corresponding in amplitude to a second portion of the radio frequency signal displayed, and said control means indicator will then indicate directly the relative amplitude of said second portion of said signal with respect to the first portion.

2. In a radio frequency spectrum analyzer for analyzing a radio frequency signal, said spectrum analyzer having a display for indicating the amplitude component portions of signals supplied to said analyzer in relation to the frequencies of said portions, a relative amplitude-measuring marker circuit comprising a signal generator with substantially stable amplitude output, means for controlling the amplitude of the output of said generator, means for supplying the output of said generator to said analyzer to cause an indication to appear on said display correlated to the amplitude of said generator in like fashion to the correlation of indications of amplitude of the radio frequency signal being analyzed, said amplitude control means having a control element, the variation of which bears a logarithmic relation to the amplitude of the output of said generator, and an amplitude control means indicator calibrated to read relative amplitudes and selectively connectable to indicate variations in said control element or, alternatively, adjustable to be independently controllable; whereby said control element may be varied to cause said indication produced on said display to correspond in amplitude to a particular portion of the radio frequency signal displayed, said amplitude control means indicator may be independently adjusted to a zero point and said control element may thereafter be varied, with corresponding change of indication of said control means indicator, to produce an indication on said display corresponding in amplitude to a second portion of the radio frequency signal displayed, and said control means indicator will then indicate directly the relative amplitude of said second portion of said signal with respect to the first portion.

3. In a radio frequency spectrum analyzer for analyzing a radio frequency signal, said spectrum analyzer having a frequency selective circuit responsive to a relatively small range of frequencies, which relatively small range of frequencies is swept in time over a larger range of frequencies, and a display for indicating the amplitude of component portions of signals supplied to said analyzer in relation to the frequencies of said portions, a relative amplitude-measuring marker circuit comprising a signal generator with substantially stable amplitude output, means for controlling the amplitude of the output of said generator, means for supplying the output of said generator to said analyzer to cause an indication to appear on said display correlated to the amplitude of said generator in like fashion to the correlation of indications of amplitude of the radio frequency signal being analyzed, said amplitude control means having a control element, the variation of which bears a predetermined relation to the amplitude of the output of said generator, and an amplitude control means indicator operative to indicate variations in said control element and also independently controllable; whereby said control element may be varied to cause said indication produced on said display to correspond in amplitude to a particular portion of the radio frequency signal displayed, said amplitude control means indicator may be independently adjusted to a zero point and said control element may thereafter be varied, with corresponding change of indication of said control means indicator, to produce an indication on said display corresponding in amplitude to a second portion of the radio frequency signal displayed, and said control means indicator will then indicate directly the relative amplitude of said second portion of said signal with respect to the first portion.

4. A radio frequency spectrum analyzer for analyzing a radio frequency signal, comprising a frequency selective circuit responsive to a relatively small range of frequencies, which relatively small range of frequencies is swept in time over a larger range of frequencies, a display for indicating the amplitude of component portions of signals supplied to said analyzer in relation to the frequencies of said portions, a relative amplitude-measuring marker circuit comprising an oscillator with substantially stable amplitude output, means for controlling the frequency of said oscillator, means for controlling the amplitude of the output of said oscillator, means for supplying the output of said oscillator to said analyzer to cause an indication to appear on said display correlated to the frequency and amplitude of the output of said oscillator in like fashion to the correlation of indications of frequency and amplitude of the radio frequency signal being analyzed, said amplitude control means having a control element, the variation of which bears a predetermined relation to the amplitude of the output of said oscillator, and an amplitude control means indicator calibrated to read relative amplitudes and selectively connectable to indicate variations in said control element or, alternatively, adjustable to be independently controllable; whereby said control element may be varied to cause said indication produced on said display to correspond in amplitude to a particular portion of the radio frequency signal displayed, said amplitude control means indicator may be independently adjusted to a zero point and said control element may thereafter be varied, with corresponding change of indication of said control means indicator, to produce an indication on said display corresponding in amplitude to a second portion of the radio frequency signal displayed, and said control means indicator will then indicate directly the relative amplitude of said second portion of said signal with respect to the first portion.

5. A radio frequency spectrum analyzer comprising a wide-band amplifier adapted to receive a radio frequency signal, the frequency components of which are to be subjected to frequency spectrum analysis, a mixer circuit connected to receive the output from said wide-band amplifier, a frequency swept local oscillator connected to supply a signal to said mixer to heterodyne with the output from said wide-band amplifier, means connected to receive the output from said mixer and adapted to pass only signals within a limited frequency range which is narrow compared to the range of frequencies swept by said swept oscillator, detector means connected to receive the output from the last said means and to supply the detected signal to the vertical deflection means of a cathode ray tube display, means for supplying a signal to the horizontal deflection means of said cathode ray tube display, said signal being synchronized with the frequency sweep of said swept oscillator, a relative amplitude-measuring marker circuit comprising a marker oscillator with substantially stable amplitude, output means for controlling the frequency of said marker oscillator, means for controlling the amplitude of the output of said marker oscillator, means for supplying the output of said oscillator wide-band amplifier to cause an indication to appear on said display correlated to the frequency and amplitude of said marker oscillator in like fashion to the correlation of indications of frequency and amplitude of the radio frequency signal being analyzed, said amplitude control means having a control element, the variation of which bears a logarithmic relation to the amplitude of the output of said marker oscillator, and an amplitude control means indicator calibrated to read relative amplitudes and selectively connectable to indicate variations in said control element or, alternatively, adjustable to be independently controllable; whereby said control element may be varied to cause said indication produced on said display to correspond in amplitude to a particular portion of the radio frequency signal displayed, said amplitude control means indicator may be independently adjusted to a zero point and said control element may thereafter be varied, with corresponding change of indication of said control means indicator, to produce an indication on said display corresponding in amplitude to a second portion of the radio frequency signal displayed, and said control means indicator will then indicate directly the relative amplitude of said second portion of said signal with respect to the first portion.

References Cited in the file of this patent

UNITED STATES PATENTS

| | | |
|---|---|---|
| 2,455,052 | Fisher | Nov. 30, 1948 |
| 2,539,971 | Potjer | Jan. 30, 1951 |
| 2,563,395 | Carpentier | Aug. 7, 1951 |
| 2,658,138 | Samuelson | Nov. 3, 1953 |
| 2,831,146 | Wu et al. | Apr. 15, 1958 |

OTHER REFERENCES

Technique of Microwave Measurement, text by C. G. Montgomery, McGraw-Hill Book Company, Inc., New York, 1947, pages 434–439.

"R.F. Spectrum Analyzer," article in Tele-Tech., July 1948, pages 30–31.